United States Patent
Tibbitts et al.

(10) Patent No.: US 9,037,609 B1
(45) Date of Patent: May 19, 2015

(54) METHOD FOR DETERMINING ACCESS OF QUERIES

(71) Applicant: Amazon Technologies, Inc., Reno, NV (US)

(72) Inventors: Graham T. Tibbitts, Puyallup, WA (US); Nathaniel Jonah Beckford, Bothell, WA (US); John K. White, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 253 days.

(21) Appl. No.: 13/663,279

(22) Filed: Oct. 29, 2012

(51) Int. Cl.
*G06F 17/30* (2006.01)

(52) U.S. Cl.
CPC .......... *G06F 17/30* (2013.01); *G06F 17/30569* (2013.01); *G06F 17/30539* (2013.01); *G06F 17/30663* (2013.01)

(58) Field of Classification Search
CPC ..................... G06F 17/30539; G06F 17/30569; G06F 17/30663
USPC .......................................................... 707/783
See application file for complete search history.

(56) References Cited

U.S. PATENT DOCUMENTS

| | | | |
|---|---|---|---|
| 7,243,097 B1* | 7/2007 | Agrawal et al. ........................ 1/1 |
| 2008/0263009 A1* | 10/2008 | Buettner et al. .................. 707/3 |
| 2008/0281853 A1* | 11/2008 | Boyle et al. .................... 707/102 |
| 2011/0208780 A1* | 8/2011 | Bird .............................. 707/784 |

OTHER PUBLICATIONS

IBM, "Column name qualifiers to avoid ambiguity", IBM Coorporation 1992, 2006, pp. 1-2.*
IBM, "Tokens", IBM Coorporation 1992, 2006, pp. 1-2.*

* cited by examiner

*Primary Examiner* — Apu Mofiz
*Assistant Examiner* — Jared Bibbee
(74) *Attorney, Agent, or Firm* — Kilpatrick Townsend & Stockton LLP

(57) ABSTRACT

A query analysis tool determines whether a list of columns within a database is accessed by a query without running the query against the database. Instead of using the database, the query is sent to a query analysis tool that uses a list of columns of interest to resolve ambiguity in the query and then determine if the query potentially accesses the list of columns of interest. If the ambiguity cannot be resolved, then the ambiguous part of the query is determined to not access any of the columns from the list of columns.

25 Claims, 11 Drawing Sheets

METHOD FOR DETERMINING ACCESS OF QUERIES

BACKGROUND

Many companies and other organizations operate databases that store information to use for various purposes. For example, databases are commonly used as part of a web application. The database is used to hold data required by the application and often accessed through the use of Structured Query Language (SQL) or other tools for submitting database queries. Many databases are structured in a hierarchical manner. For example, many relational databases use the one-to-many structure of a database containing many tables with each table containing many columns. Each schema, table and column may be individually identified. For example, a fully qualified column in a relational database may use a schema identifier, table identifier and column identifier together to identify the location of the fully qualified column.

BRIEF DESCRIPTION OF THE DRAWINGS

Various embodiments in accordance with the present disclosure will be described with reference to the drawings, in which.

DETAILED DESCRIPTION

Figure 1:
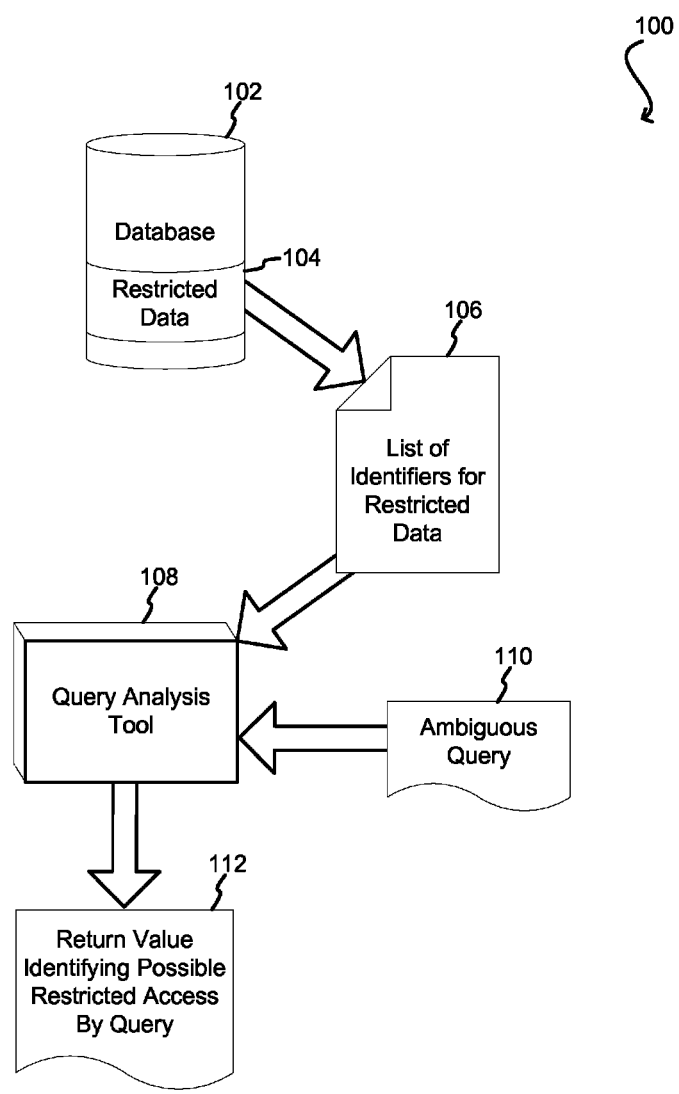
FIG. 1 shows an illustrative example of a system to evaluate the access of queries in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to maintaining the integrity of data in a database and generally relate to techniques for performing checks on database queries without requiring execution of the queries against the database. In some embodiments, the techniques described and suggested herein include determining whether a list of columns within a database is accessed by a query without running the query against the database. A query is sent to a query analysis tool that uses the list of columns to resolve ambiguity in the query and then determine if the query potentially accesses the list of columns. If the ambiguity cannot be resolved, then the ambiguous part of the query is determined to not access any of the columns from the list of columns. For example, a customer that is worried that a query might access privileged information, such as social security numbers, may send the query to the query analysis tool to determine whether the privileged information is accessed without impacting the database. This provides the advantage of determining whether privileged information is accessed with complex and/or ambiguous queries that are normally resolved upon database access without taxing the database itself. In another example, the query analysis tool may determine if all accesses to the database by a query are on a list of columns served by a database server. If so, the query may be directly routed to and processed by the server.

In one embodiment, a list of restricted columns from a database containing restricted customer data is given to the query analysis tool. The query analysis tool may then process one or more queries to determine if the queries access sensitive data. To process a query, the query may be broken down into tokens that identify individual parts of the query. Aliases may be resolved such that an alias results in an identifier that may or may not be ambiguous. For example, a table alias may be resolved to a table identifier. The tokens may include database access tokens that identify database access to columns in the database. These database access tokens may include schema identifiers, table identifiers and column identifiers. For example, a fully qualified column for a relational database may include a schema identifier, table identifier and column identifier. A fully qualified column can define the location of a column in the database. If the column is missing one of the previous identifiers, the query may be known as unqualified or ambiguous. In some cases, the missing identifier is implied by the context of the query instead of the query itself. By combining the related database access tokens, information about access to a column may be determined to form a fully qualified column. In this embodiment, a fully-qualified column may contain a schema identifier, table identifier and column identifier. The fully qualified columns identified in the tokens may then be checked to see if they exist in the list of restricted columns. The query access tool may then return the result of whether the fully qualified columns exist in the list of restricted columns.

In some cases, the query may reference unqualified columns where one or more of the identifiers may be implied by the query, implicit to the query or retrieved from the database at runtime. The unqualified columns may be made into fully qualified columns by matching information about the column with information in the list of restricted columns. For each match in the list of restricted columns, one or more potential combinations may be made with the existing identifiers for the unqualified column to form a set of potential fully qualified columns. The potential fully qualified columns may then be compared against the list of restricted columns and the result returned by the query access tool. In this embodiment, all actual query accesses to the restricted columns would be captured.

By using the query analysis tool, query analysis and query performance may be separated such that a production database may not be impacted by query analysis. This separation allows for audits, development and other database procedures to occur without accessing the database and potentially harming performance. Such procedures may include periodic security audits of query access, testing new queries and routing of new queries.

In another embodiment, a list of columns hosted by a server is used to determine whether a client may directly route a query to the server. By analyzing the query and constructing potential fully qualified columns from unqualified columns, a query analysis tool can determine if all of the columns accessed exist on the server. If all of the columns exist on the server, the query may be allowed to route to the server.

Turning now to FIG. 1, an illustrative example of a system 100 to evaluate the access of queries in accordance with at least one embodiment is shown. Information about identifiers for restricted data from a database 102 is sent to a query analysis tool 108 to determine if a query, such as an ambiguous query 110, accesses restricted data 104 in the database 102. More specifically, in FIG. 1 a database 102 is constructed with schema, tables and column identifiers. Using these identifiers, columns having restricted data 104 are identified and stored as fully qualified column identifiers in list 106 (although other data structures may be used). This list may be constructed in various ways, including accessing the database during a low period, retrieval from a matching testing database, retrieval from a matching development database or even constructing the list without accessing the database, such as hand coding the list.

A client may submit an ambiguous query 110 to be analyzed by a query analysis tool 108 to determine if the query accesses the restricted data 104. To process the ambiguous query 110, the ambiguous query 110 may be broken down into tokens that identify individual parts of the ambiguous query 110. The tokens may include database access tokens that identify database access to columns in the database. These database access tokens may include schema identifiers, table identifiers and column identifiers. In this embodiment, a fully-qualified column may contain a schema identifier, table identifier and column identifier. The ambiguous query 110 may access multiple columns. By combining the related database access tokens, information about access to a column may be determined to form as much of a fully qualified column as possible. However, the ambiguous query 110 may reference unqualified columns where one or more of the identifiers may be implied by the ambiguous query 110, implicit to the ambiguous query 110 or retrieved from the database 102 at runtime. The unqualified columns may be made into fully qualified columns by matching information about the column with information in the list of restricted columns 106. For each match in the list of restricted columns 106, one or more potential combinations may be made with the existing identifiers for the unqualified column to form a set of potential fully qualified columns. The potential fully qualified columns may then be compared against the list of restricted columns 106. The query access tool 108 may then return the return value 112 indicating whether the fully qualified columns exist in the list of restricted columns 106. Depending on the embodiment, the return value 112 may be a true/false value, a number indicating the amount of columns accessed a list of columns accessed, a list of restricted columns accessed and/or a hybrid data structure combining multiple values.

The restricted data may include private data or data restricted to a particular configuration. For example, private restricted data may include customer information. This customer information may be private due to its nature or due to inclusion with other information. For example, a customer name may not be private alone, but becomes private information when combined with a customer address. Data restricted to a particular configuration may also be restricted data. For example, portions of a database may exist in different geographical areas. A query from a local machine is intended to be routed to a local database server. The restricted data is data limited to the local server. If the query only accesses locally restricted data, the query may be routed to the local database server.

Figure 2:
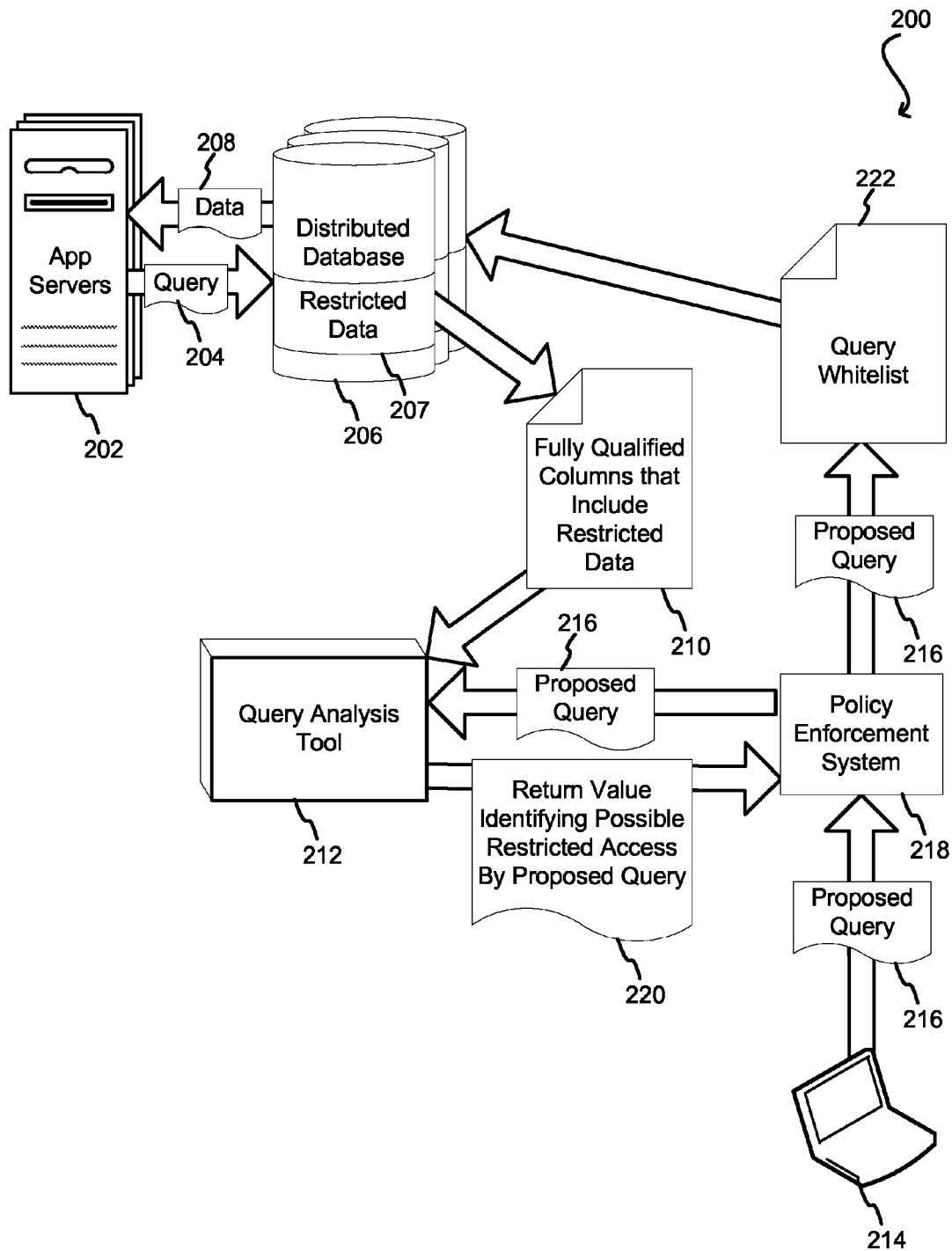
FIG. 2 shows an illustrative example of a system to evaluate query access and enforce query restrictions in accordance with at least one embodiment.

Turning now to FIG. 2, an illustrative example of a system 200 to evaluate query access and enforce query restrictions in accordance with at least one embodiment is shown. A distributed production database 206 continues operations with application servers 202 without slowdown due to query analysis because a policy enforcement system 218 uses a query analysis tool 212 that does not need access to the database 206 to determine if a proposed query 216 satisfies policy rules. More specifically, application servers 202 send queries 204 to a distributed database 206 and receive data 208 back from the distributed database 206 during operation. The database 206 may include restricted data 207 that is noted in a list of fully qualified columns 210 that include that restricted data 207.

A client 214 may submit a proposed query 216 to a policy enforcement system 218 such that the query may be approved for use with the application servers 202 and database 206. The policy enforcement system 218 may review the proposed query 216, which may include submitting the proposed query 216 to a query analysis tool 212 to determine if the proposed query 216 accesses restricted data 206. As described before, the query analysis tool may break down the query to qualify accessed columns accessed as much as possible. If needed, the query analysis tool 212 may match identifiers associated with the columns (such as schema, table and column identifiers) to fully qualified columns in the list 210 to identify potential combinations of fully qualified columns that may be accessed. The query analysis tool 212 may then determine whether restricted data 207 was potentially accessed in the proposed query 216 and return a value 220 indicating the access to the policy enforcement system 218. If the proposed query 216 meets the policies enforced by the policy enforcement system 218, which may include policies regarding access to restricted data 207, the proposed query 216 may be included in a query whitelist 222 that allows the query to be performed on the database 206. If the proposed query 216 does not meet the policies, the proposed query 216 may be flagged for human review.

Depending on the embodiment, the whitelist may be used in a strict or permissive manner. In one embodiment, a query sent to a database may be first checked by the policy enforcement system 218 to determine if the query is an exact match of a query on the whitelist and if the account performing the query has permission to perform the query. If either check fails, the query may be denied before it is performed. In another embodiment, a query sent to a database is matched against a whitelist by a policy enforcement system 218. If the query is similarly formed to a whitelisted query, the query may be allowed to proceed. In another embodiment, the whitelist may be used to approve code containing one or more queries. For example, a code analysis may be performed for queries sent to a database. If the code analysis turns up queries that are not whitelisted, the code may not be approved. If the code analysis turns up only whitelisted queries, the code may be approved for execution.

The accuracy of the query analysis tool 212 may be determined by the information contained in the list 210 of fully qualified columns. For example, in some embodiments, the database structure is reflected in the list 210 of fully qualified columns with the restricted data marked as restricted. By having the database structure, ambiguous queries may be more accurately resolved such that false positives may be reduced or, in some cases, eliminated. In some embodiments it may not be practical to store the database structure. However, important columns, such as frequently queried columns or columns that could form a combination that makes an ambiguous query appear to access restricted data, may be included in the list 210 to reduce false positives and/or speed up processing.

Figure 3:
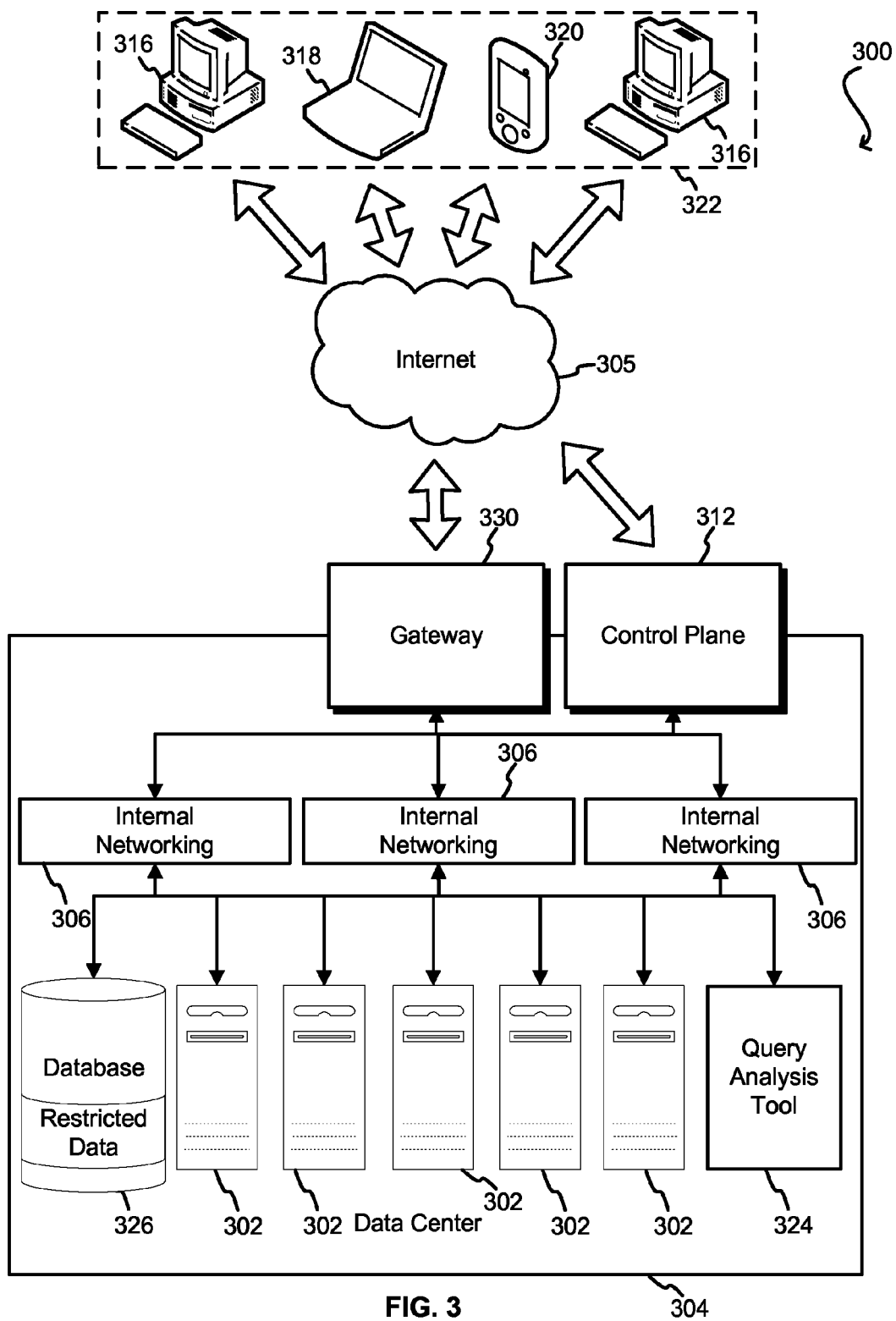
FIG. 3 shows an illustrative example of an environment for query access evaluation in accordance with at least one embodiment.

Turning now to FIG. 3, an illustrative example of an environment 300 for query access evaluation in accordance with at least one embodiment is shown. A data center 304 may house the database 326, query analysis tool 324 and servers 302 to which clients 322 may have restricted access through the Internet 305 and a gateway 330. More specifically, a data center 304 may service computing resources in the data center 304, such as a program execution service that provisions servers 302, databases 326, network infrastructure 306, query analysis tools 324 and other infrastructure, platforms, tools, etc. Management of the computing resources may be performed by a control plane 312, which may receive instructions over an external network, such as the Internet 305. Clients 322, such as desktops 316, laptops 318 and mobile devices 320 may interact with the computing resources through the gateway 330 or manage computing resources through the control plane 312.

In one embodiment, the servers 302 query the database 326, while a client 322 requests the query analysis tool 324 to determine whether a proposed query accesses restricted data 326. Because a list of fully qualified columns is used, rather than database access, the query analysis tool may determine the potential access of restricted data 326 without a request to the database 326. The result may either be reported back to the client or to the control plane 312, depending on the embodiment.

Figure 4:
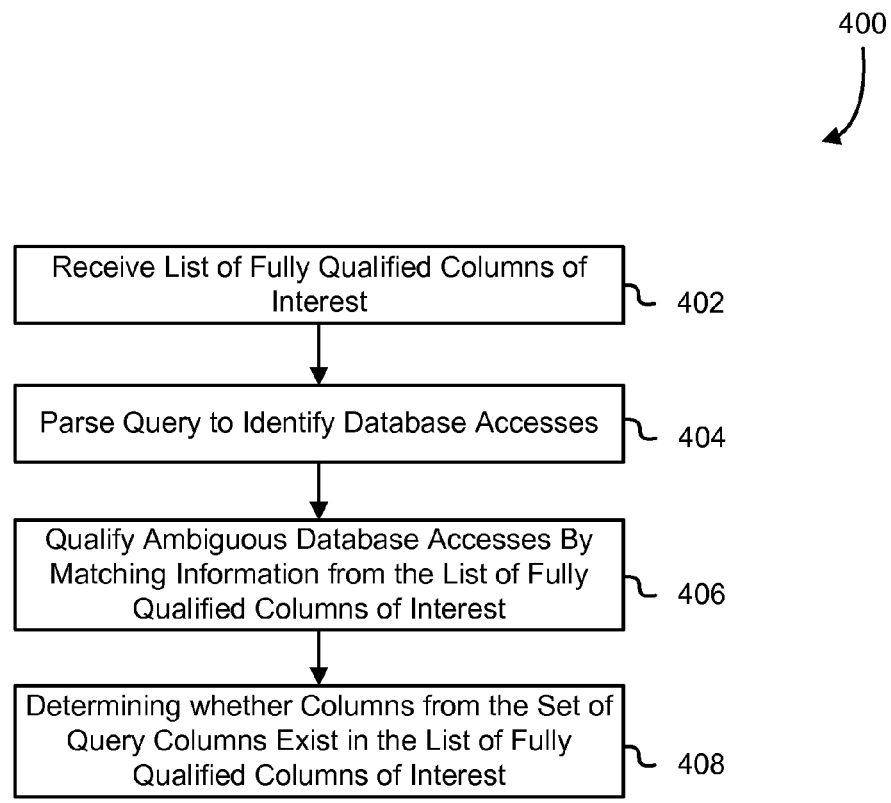
FIG. 4 shows an illustrative example summary of a process that may be used to evaluate query access in accordance with at least one embodiment.

Turning now to FIG. 4, an illustrative example summary of a process 400 that may be used to evaluate query access in accordance with at least one embodiment is shown. The process 400 may be accomplished by computing resources seen in FIG. 2, such as by the query analysis tool 212 and policy enforcement system 218. A query analysis tool receives 402 a list of fully qualified columns of interest. The columns of interest may represent columns within a database that should be noted if a query accesses those columns. The query analysis tool parses 404 the query to identify database accesses, such as columns accessed. This parsing may include the tokenizing of the query to identify schemas, tables and columns to qualify the database accesses into fully qualified query columns as much as possible. Ambiguous database accesses may be qualified 406 by matching unqualified columns discovered by the parsing operation 404 with fully qualified columns in the list of fully qualified columns of interest. Possible combinations may be created using the unqualified columns with the fully qualified columns to fill in the ambiguous identifiers to form a set of potential fully qualified query columns. The list of fully qualified columns of interest may then be compared with the fully qualified database accesses to determine 408 whether columns from the set of query columns exist in the list of fully qualified columns of interest. The result of this determining can then be returned back from the query analysis tool.

For example, many different queries may be used to retrieve information from a billing database. The queries may have various purposes, including generating an invoice, processing a reoccurring payment, generating a list of delinquent accounts and determining in which states sales were made. Since the billing database contains both private and non-private information, a client may want to determine and/or enforce the access of queries to the database. A query that accesses credit card information may be treated differently than a query that only accesses state information. Using the operations of process 400, a query analysis tool may determine which private columns from the database are accessed using a private column list without touching the database.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 5:
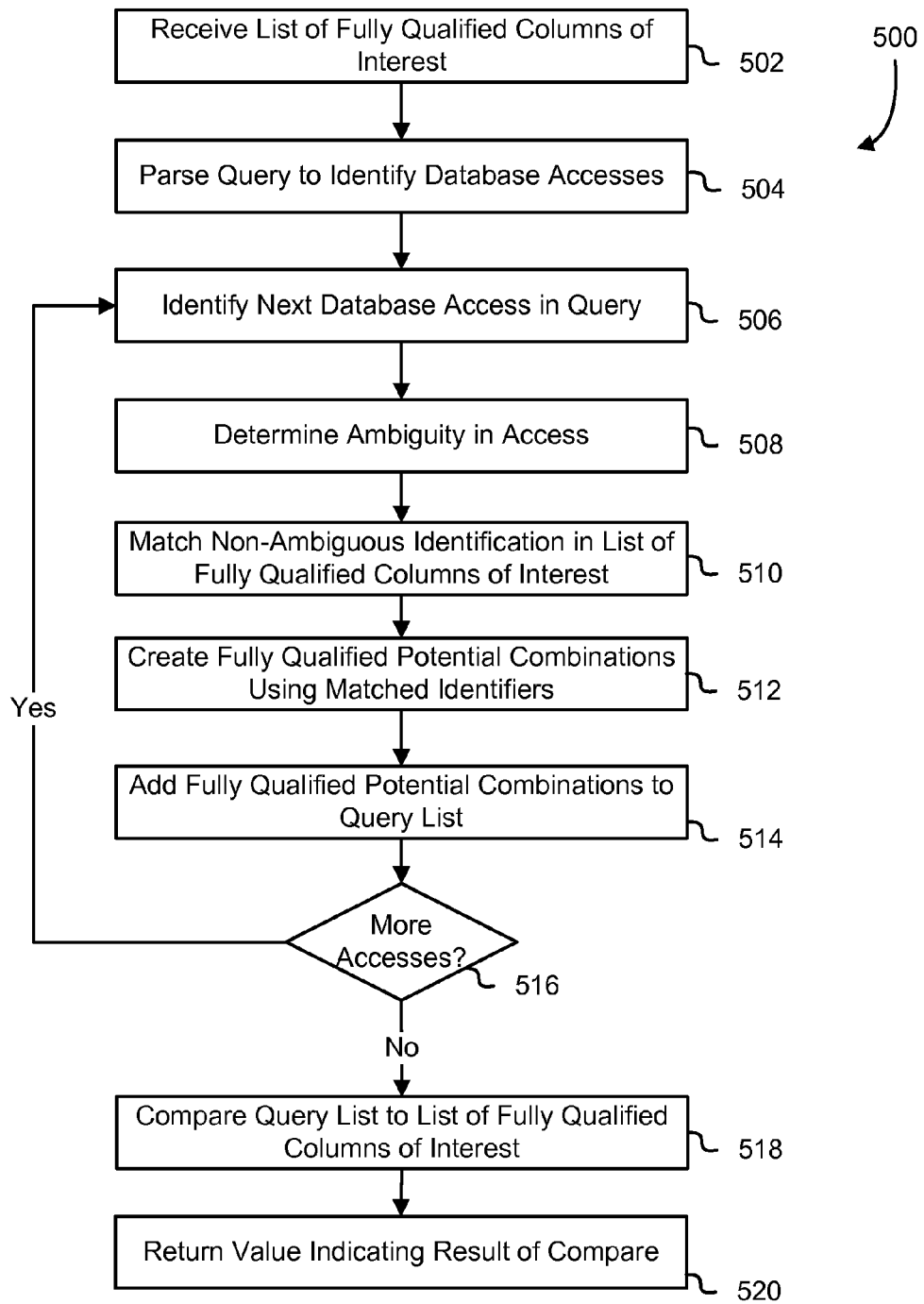
FIG. 5 shows an illustrative example of a process that may be used to evaluate query access in accordance with at least one embodiment.

Turning now to FIG. 5, an illustrative example of a process that may be used to evaluate query access in accordance with at least one embodiment is shown. The process 500 may be accomplished by computing resources seen in FIG. 2, such as by the query analysis tool 212 and policy enforcement system 218. A query analysis tool 212 receives 502 a list of fully qualified columns of interest. The list may be formatted in various ways, such as XML, comma separated variable, binary or other data structure or file format. The query analysis tool may receive a query and parse 504 the query to identify database accesses. The query may be in one of many formats, including SQL, UnQL, Object Query Language, Java Persistence Query Language or other formats used to access a database. The query may include data definition language, data manipulation language and/or data control language. In one embodiment the query is tokenized such that schema, table and columns tokens may be identified and correlated. A first database access may be identified 506 and selected to process. Ambiguities in the database access may be determined 508 such that missing identifications may be inferred, which may include missing schema, table or column identifiers. Non-ambiguous identifiers in the access may be matched 510 with identifiers in the list of fully qualified columns of interest. Potential fully qualified combinations of the ambiguous access may be created 512 using the matched identifiers from the fully qualified columns of interest. The fully qualified potential combinations may then be added 514 to a query list identifying potential fully qualified accesses to the database. If there are more accesses 516, the operations of 506 to 514 may be repeated for each access identified. If there are no more accesses 516, the query list may be compared 518 against the list of fully qualified columns of interest. Accesses in the query list that exist in the list of fully qualified columns of interest may then be compiled. A return value indicating 520 the result of whether and/or how many of the accesses in the query list exist in the list of fully qualified columns of interest may be returned. In some embodiments, the return value may actually reflect how many of the accesses in the query list do not exist in the list of fully qualified columns of interest, such as in the embodiments related to query routing.

Figure 6:
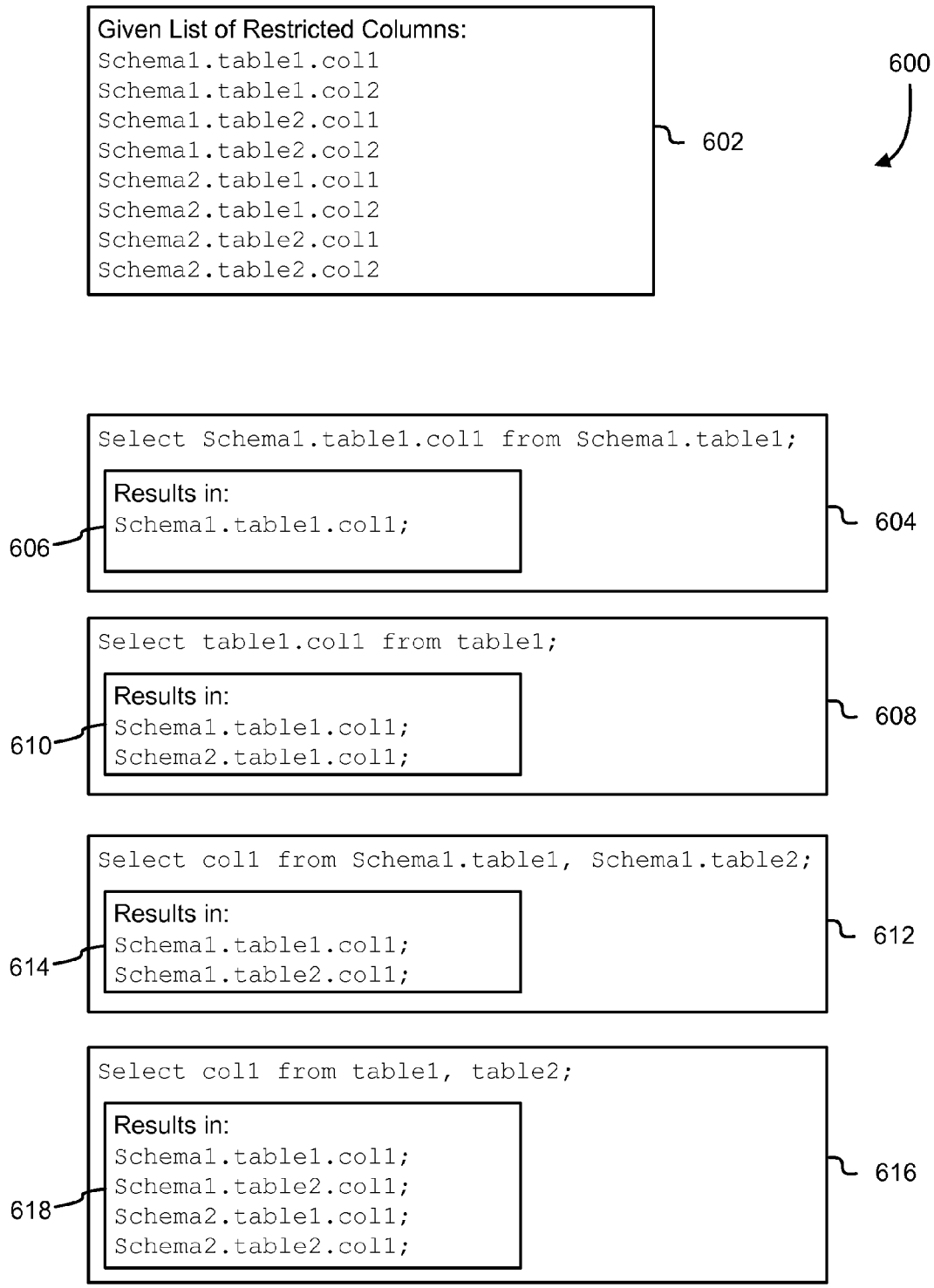
FIG. 6 shows an illustrative chart of an ambiguous query resolving in accordance with at least one embodiment.

Turning now to FIG. 6, an illustrative chart 600 of ambiguous query resolving in accordance with at least one embodiment is shown. The data shown may be received, processed and/or returned by a query analysis tool 212 as seen in FIG. 2. The query analysis tool may be given a list of restricted columns 602. In the restrictive columns shown, there are two schemas, two similarly identified tables per schema and two identified columns per schema with similar names. Examples 604, 608, 612 and 616 show the resulting query lists 606, 610, 614 and 618 when provided an example SQL pseudo code request.

In example 604, a fully qualified column shown as "Schema1.table1.col1" is requested. Therefore there is no ambiguity to resolve and the fully qualified column is added to the query list. As the query list 606 contains a column in the list of restricted columns 602, the return value from the query analysis tool should reflect that at least one column is contained in the list of restricted columns 602. In this example, a return value of true and/or one may be returned.

In example 608, a partially qualified column shown as "table1.col1" is requested from "table1." Using the list of restricted columns, it is noted that there exists a "Schema1.table1.col1" and "Schema1.table1.col1" combination that matches both the "table1.col1" and "table1" to form the combination. This combination is then added to the query list 610. No other combinations are viewed as possible. As the query list 610 contains a column in the list of restricted columns 602, the return value from the query analysis tool should reflect that at least two columns are contained in the list of restricted columns 602. In this example, a return value of true and/or one may be returned.

In example 612, a partially qualified column shown as "col1" is requested from "Schema1.table1" or "Schema1.table2." While this query may be correctly interpreted in the proper context, the query is ambiguous because the columns appear to come from two tables. Using the list of restricted columns 602, it is noted that "Schema.table1.col1" and "Schema.table2.col1" are possible columns. These possible columns are added as possible combinations into the query list 614. As the query list 614 contains a column in the list of restricted columns 602, the return value from the query analysis tool should reflect that at least one column is contained in the list of restricted columns 602. A return value in this example may be true and/or two.

In example 616, a partially qualified column shown as "col1" is requested from "table1" or "table2." In the normal context of the query, this access may not be ambiguous and could be resolved. However, without the context of the query, the query may be resolved through potential combinations using the list of restricted columns 602. Matches for "col1" may be found in both "Schema1" and "Schema2." Both "Schema1" and "Schema2" have a "table1" and "table2." Combinations of these identifiers are then inserted into query list 618. Therefore, the potential combinations may include the columns shown in query list 618, including "Schema1.table1.col1," "Schema1.table2.col1," "Schema2.table1.col1" and "Schema2.table2.col1." The query list 618 may be compared against the list of restricted columns 602. A return value from the query analysis tool may be based on how many fully qualified columns from the query list 618 exist in the list of restricted columns 602. In this case, a return value of true and/or four may be returned.

In total, there may be at least eight examples of ambiguous queries, with only a subset shown here. There may be queries that have ambiguities in schema, schema and table, schema and column, schema and table and column, table, table and column, column and no ambiguity. The ambiguities may be resolved as above, where unambiguous information from the list of restricted columns 602 may be matched and used to make potential combinations For example, a star selector represented by a "*" may be used in place of a column to make an ambiguous column. A query analysis tool may use the unambiguous identifiers in the query, such as the schema and/or table identifier to match with identifiers in the list of restricted columns 602 and create possible combinations in a query list. The query list may then be compared against the list of restricted columns 602. A return value from the query analysis tool may be based on how many fully qualified columns from the query list exist in the list of restricted columns 602.

Figure 7:
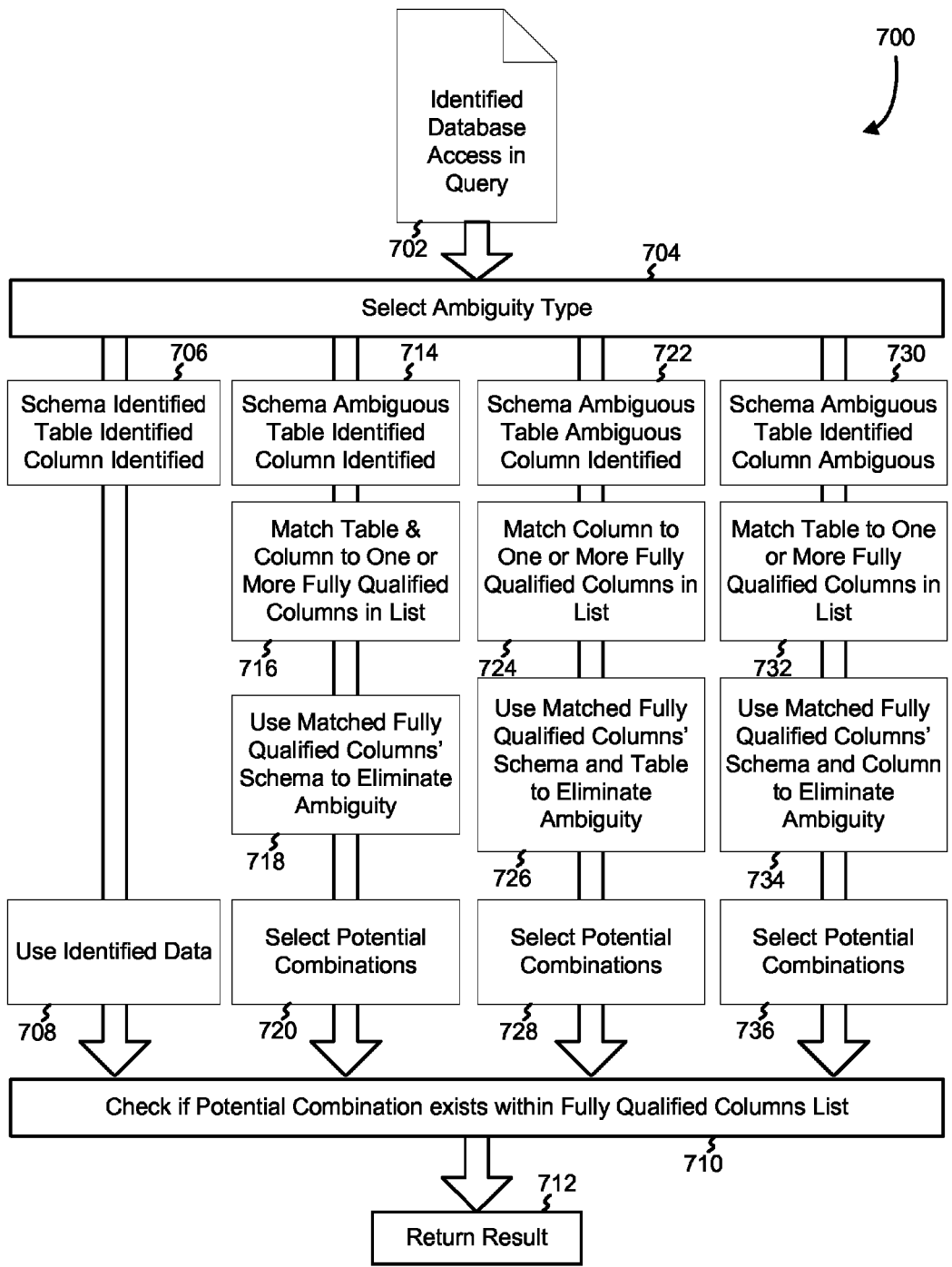
FIG. 7 shows an illustrative example of a process that may be used to resolve query ambiguity by ambiguity type in accordance with at least one embodiment.

Turning now to FIG. 7, an illustrative example of a process 700 that may be used to resolve query ambiguity by ambiguity type in accordance with at least one embodiment is shown. The process shown may be accomplished by a query analysis tool 212 processing a proposed query 216 using a list of fully qualified columns 210 from database 206 as seen in FIG. 2. Using an identified database access 702 in a query, the query analysis tool may select an ambiguity type 704 to resolve. In this example, the ambiguity types may include no ambiguity, ambiguous schema, ambiguous schema and table, and ambiguous schema and column. However, other ambiguities may also be possible, as the process 700 shown is merely an example. For example, there may be queries that have ambiguities in schema, schema and table, schema and column, schema and table and column, table, table and column, column and no ambiguity.

In a first ambiguity path, a path of no ambiguity is selected 706 because the schema, table and column are identified. Then the identified data may be used 708 as a combination. The combination may then be checked to see if it exists within the fully qualified columns list 710 and the result returned 712.

In a second ambiguity path, a path of ambiguous schema is selected 714 because only the table and column is identified. The identified table and column information may then be matched 716 to the fully qualified columns in a list of fully qualified columns in a manner as seen in FIG. 6. The matched fully qualified columns in the list may then be used to eliminate the ambiguity 718 by selecting 720 potential combinations. The combinations may then be checked to see if they exist within the fully qualified columns list 710 and the result returned 712.

In a third ambiguity path, a path of ambiguous schema and table are selected 722 because only the column is identified. The identified column information may then be matched 724 to the fully qualified columns in a list of fully qualified columns in a manner as seen in FIG. 6. The matched fully qualified columns in the list may then be used to eliminate the ambiguity 726 by selecting 728 potential combinations. The combinations may then be checked to see if they exist within the fully qualified columns list 710 and the result returned 712.

In a fourth ambiguity path, a path of ambiguous schema and column are selected 730 because only the table is identified. The identified table information may then be matched 732 to the fully qualified columns in a list of fully qualified columns in a manner as seen in FIG. 6. The matched fully qualified columns in the list may then be used to eliminate the ambiguity 734 by selecting 736 potential combinations. The combinations may then be checked to see if they exist within the fully qualified columns list 710 and the result returned 712. In other embodiments, the operations 710 and 712 may be postponed until all database accesses have been reviewed and all potential combinations are stored in the query list.

Figure 8:
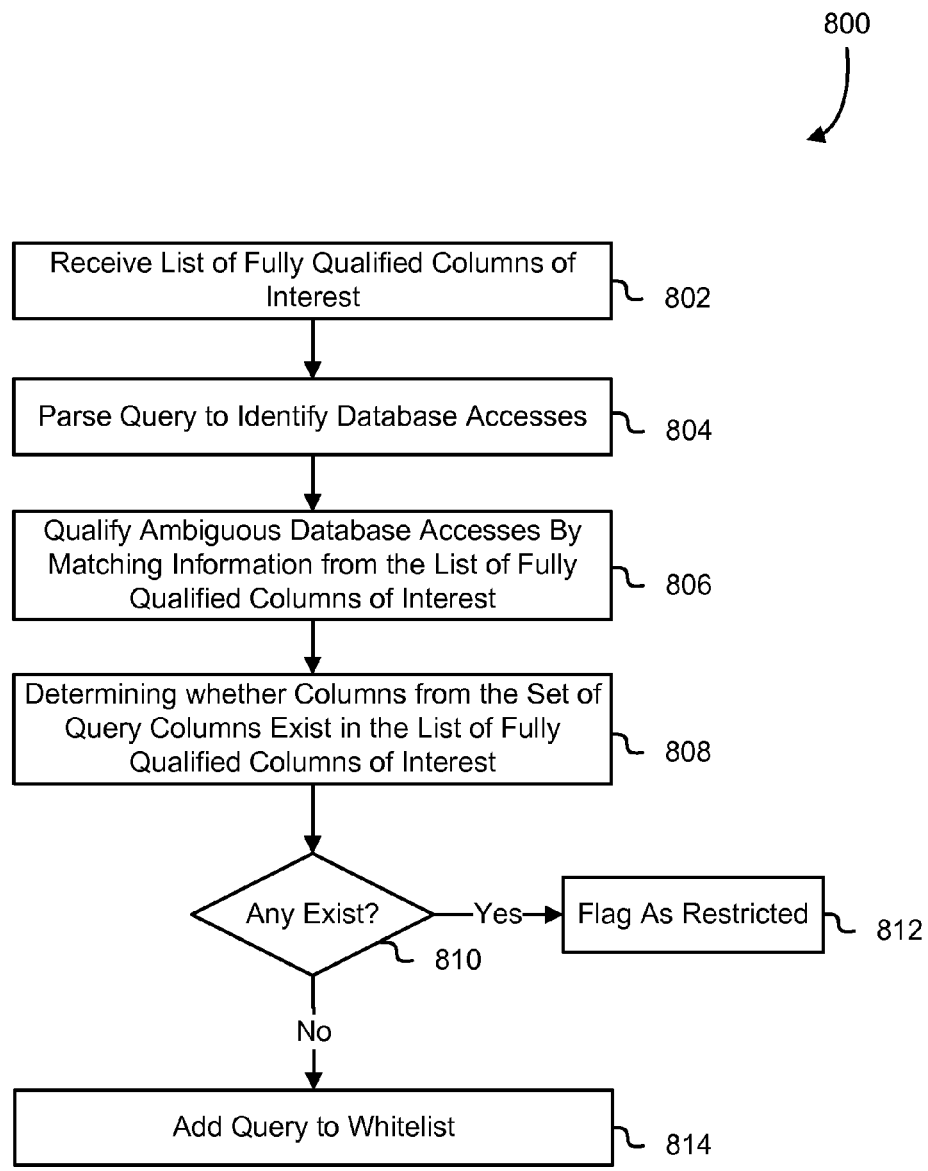
FIG. 8 shows an illustrative example of a process that may be used to determine whether to restrict a query based on column access in accordance with at least one embodiment.

Turning now to FIG. 8, an illustrative example of a process 800 that may be used to determine whether to restrict a query based on column access in accordance with at least one embodiment is shown. The process shown may be accomplished by a query analysis tool 212 processing a proposed query 216 using a list of fully qualified columns 210 from database 206 as seen in FIG. 2. A list of fully qualified columns of interest may be received 802 that identify columns having restricted information. The query may then be parsed 804 to identify database accesses to columns within the query. Ambiguous information from the query may be rendered from a match with non-ambiguous identifiers in the query that match 806 the list of fully qualified columns of interest. These matching columns may be used to create a query list of potential resolutions to the ambiguous database accesses from the query. The query list may then be compared against the list of fully qualified columns of interest to determine 808 if any exist 810 in the query list and the list of fully qualified columns of interest. If so, the query may be flagged as restricted, and/or for a human to review later. If not, the query may be whitelisted 814 for use with the database.

In some embodiments, incomplete information may lead to false positive reports of queries accessing restricted information. For example, if only restricted columns are listed in the fully qualified columns of interest, ambiguities in an unqualified column may be resolved to include the available restricted column information. However, a normal operation of the query against the database would provide context that would resolve the query to a column that is not restricted. Therefore, in some embodiments, it may be advisable to first flag a query for human review before denying the query. A human may be able to determine that the query is actually a false positive due to incomplete context or if the query accesses information for which it does not have permission.

This process may be repeated not only upon an initial creation of the query, but also other situations. This query analysis may be triggered based on policy changes, policy audits or even a periodic audit. For example, a company may periodically verify that all of its queries that access restricted information have received prior approval. Every month, the query analysis tool may receive a list of columns of interest, a set of queries to process and a list of queries that are expected to access restricted information. Each query may then be analyzed to determine if the query potentially accesses restricted information. The result of the access may then be compared against the list of queries to access restricted information. Queries that are not on the list, but should be or queries that are on the list, but should not be can be flagged for further review.

Figure 9:
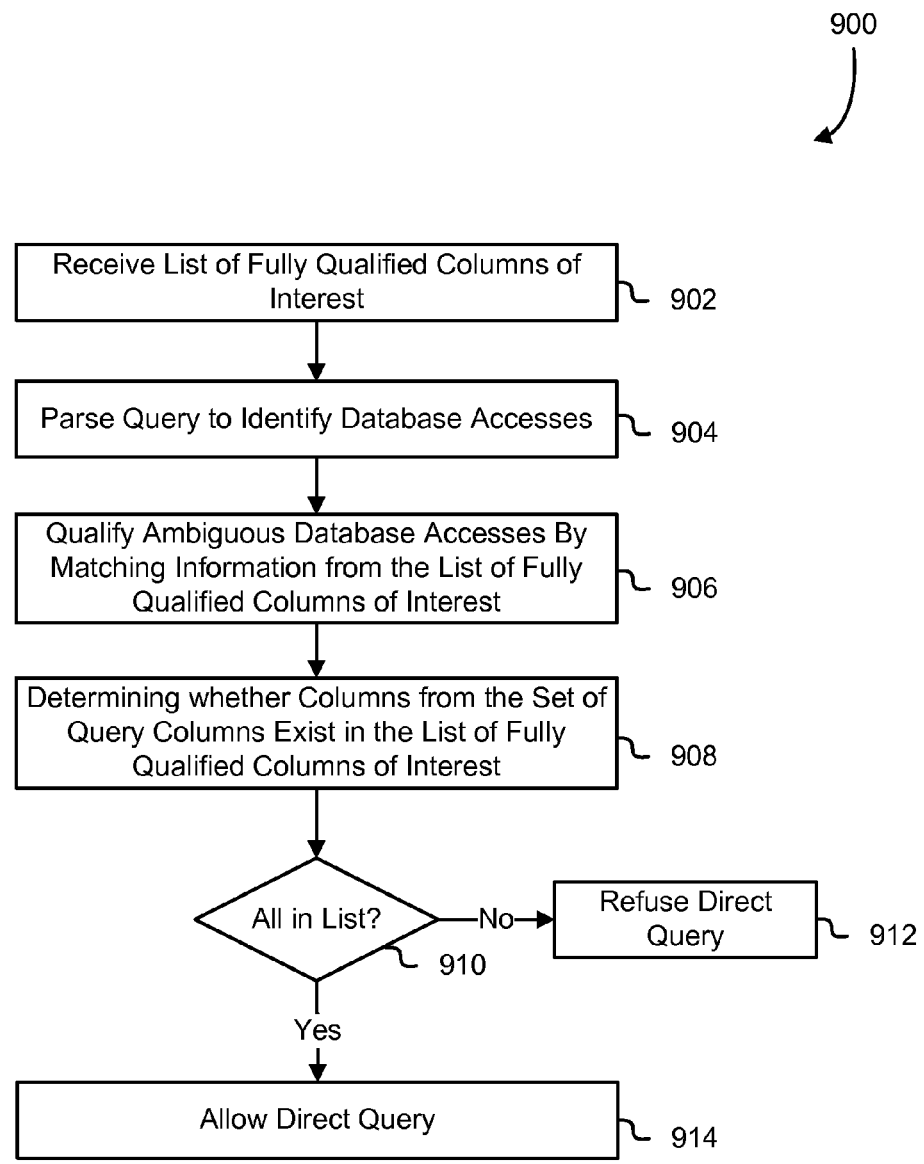
FIG. 9 shows an illustrative example of a process that may be used to determine whether an efficient query routing may be performed in accordance with at least one embodiment.

Turning now to FIG. 9, an illustrative example of a process that may be used to determine whether an efficient query routing may be performed in accordance with at least one embodiment is shown. The process shown may be accomplished by a query analysis tool 212 processing a proposed query 216 using a list of fully qualified columns 210 from database 206 as seen in FIG. 2. For example, a list of fully qualified columns of interest may be received 902 that identify columns having information residing on a single server. The query analysis tool may then be used to determine if a query can route to the single server. The query may then be parsed 904 to identify database accesses to columns within the query. Ambiguous information from the query may be rendered from a match with non-ambiguous identifiers in the query that match 906 the list of fully qualified columns of interest. These matching columns may be used to create a query list of potential resolutions to the ambiguous database accesses from the query. The query list may then be compared against the list of fully qualified columns of interest to determine 908 if all exist 910 in the query list and the list of fully qualified columns of interest. If so, the query may be whitelisted 914 for direct routing. If not, the query may be required to go through a different routing and refused 912 a direct query. Queries that are directly routed may be reviewed by a policy enforcement system 218, such as seen and explained in FIG. 2.

Figure 10:
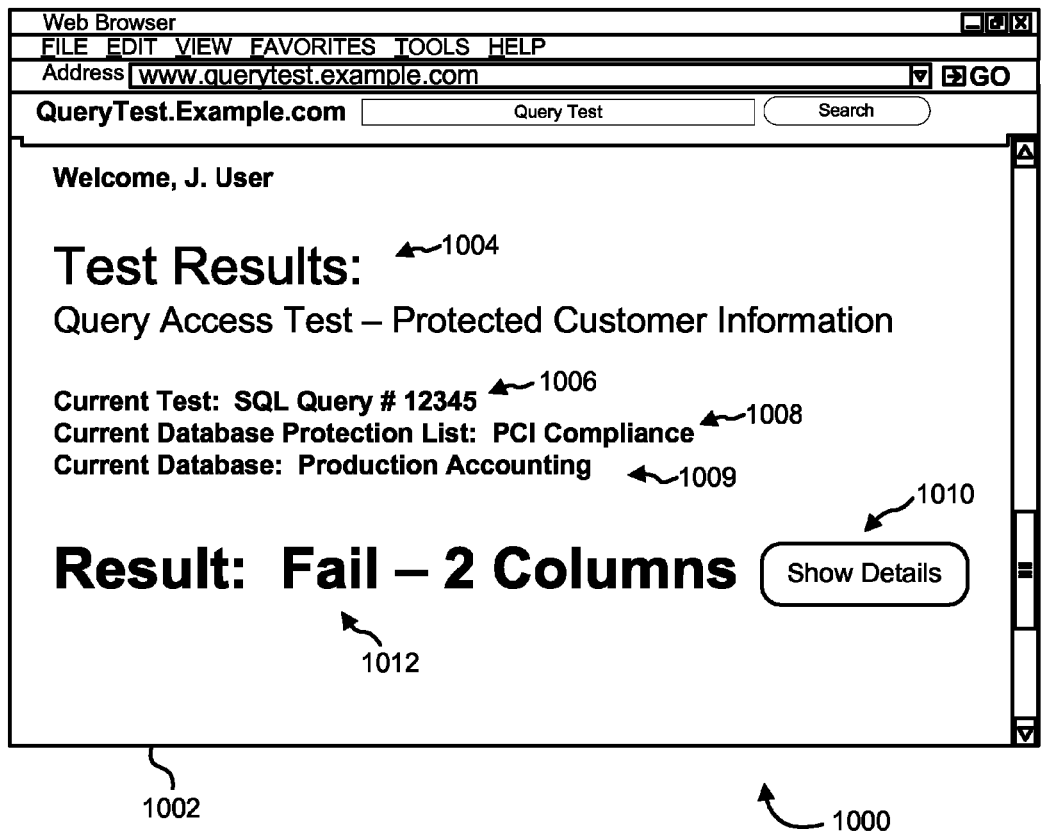
FIG. 10 shows an illustrative example of a management interface screen in accordance with at least one embodiment.

Turning now to FIG. 10, an illustrative example of a web management interface screen 1000 in accordance with at least one embodiment is shown. In some embodiments, it may be desirable to provide feedback to users of a query analysis system. For example, a developer may desire that all queries in a program be tested for access to restricted information. If this information were to be checked against a production database, a user experience of the database might be degraded by all of the tests. However, a query analysis tool may allow the developer to run the tests without impacting the database. The developer may use application programming interfaces to perform the tests and a web browser to view the results. In the embodiment shown, a web management screen may be shown through a browser interface 1002, such as a web browser. A result of a failed test is displayed. The title 1004 provides information related to the test. Query analysis tool information may also be displayed, such as a current test value 1006, a list of columns of interest 1008 used during the test and the database name 1009 against which the query analysis tool was applied. The result 1012, in this case a set of failures, may be shown, as well as a button 1010 or link to show more information about why the query failed, such as which columns were contained in the query list and the list of columns of interest. Using this information and information from subsequent screens, a developer may determine that the query access should be narrowed, the query permissions should be enlarged or that all restricted information accesses should provide a visible failure, even if appropriate.

Figure 11:
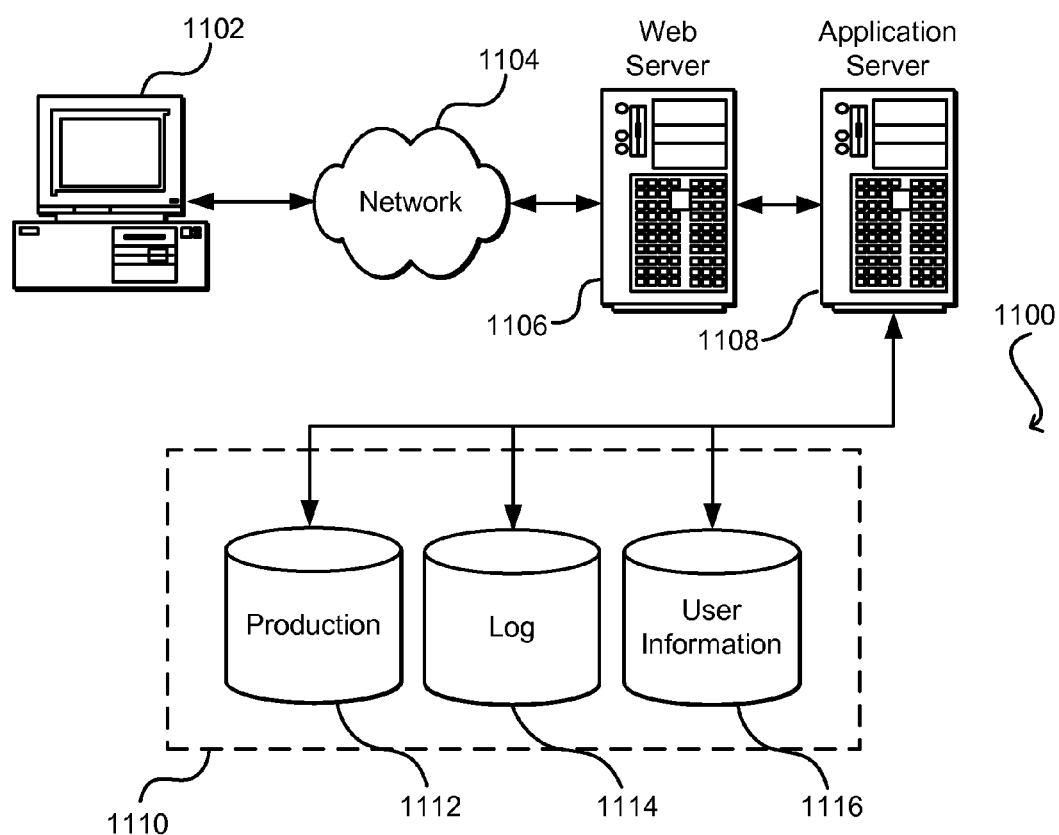
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for determining access of a query to privileged information, comprising:
    under the control of one or more computer systems configured with executable instructions,
        receiving a list of fully qualified privileged columns of a relational database, the columns having associated schema identifiers, table identifiers and column identifiers;
        receiving a database query;
        splitting the query into tokens;
        identifying potentially accessed columns from the tokens;
        generating a set of fully qualified columns by at least:
            generating possible combinations for potentially accessed columns that are unqualified by joining one or more unqualified potentially accessed columns with matching schema identifiers, table identifiers or column identifiers from the list of privileged columns to form a set of fully qualified potentially accessed columns;
        computing a determination of whether the query accesses a privileged column by determining if one or more columns from the set of fully qualified potentially accessed columns exist in the privileged columns; and
        returning a value indicating the computed determination.

2. The computer-implemented method of claim 1, further comprising resolving a table identifier from a table alias in the query.

3. The computer-implemented method of claim 1, wherein generating the set of fully qualified columns further comprises selecting fully qualified columns from the accessed columns.

4. The computer-implemented method of claim 1, wherein generating a set of fully qualified columns further comprises determining a potential schema to qualify a column having a table identifier and a column identifier but an ambiguous schema identifier by at least:
 selecting a schema identifier by matching the table identifier and the column identifier with identifiers from a list of privileged columns; and
 making at least one fully qualified column by combining the selected schema identifier in combination with the table identifier and the column identifier.

5. The computer-implemented method of claim 1, wherein generating a set of fully qualified columns further comprises determining a potential schema and a potential table to qualify a column having a column identifier but an ambiguous schema identifier and an ambiguous table identifier by:
 selecting a schema identifier and a table identifier by matching the column identifier with identifiers from a list of privileged columns; and
 making at least one fully qualified column by combining the selected schema identifier and the selected table identifier in combination with the table identifier and the column identifier.

6. The computer-implemented method of claim 1, wherein generating a set of fully qualified columns further comprises determining a potential schema and a potential column to qualify a column having a table identifier but an ambiguous schema identifier and an ambiguous column identifier by:
 selecting a schema identifier and a column identifier by matching the table identifier with identifiers from a list of privileged columns; and
 making at least one fully qualified column by combining the selected schema identifier and the selected column identifier in combination with the table identifier.

7. A computer-implemented method for determining query access, comprising:
 under the control of one or more computer systems configured with executable instructions,
  receiving a query;
  qualifying unqualified columns from a set of query columns by joining unqualified columns from the set of query columns with matching information from a list of fully qualified columns of interest; and
  determining whether columns from the set of query columns exist in the list of fully qualified columns of interest.

8. The computer-implemented method of claim 7, wherein the list of fully qualified columns of interest describes columns within a database.

9. The computer-implemented method of claim 8, wherein receiving, qualifying and determining are performed without accessing the database.

10. The computer-implemented method of claim 7, wherein the list of fully qualified columns of interest contains restricted information and wherein the method further comprises returning a value representing whether the query potentially accesses restricted information.

11. The computer-implemented method of claim 7, wherein the list represents columns available on a database server and wherein the method further comprises:
 approving a query to route directly to the database server when all columns from the set of query columns exist in the list of fully qualified columns of interest.

12. The computer-implemented method of claim 7, further comprising:
 receiving a list of all columns potentially accessed by the query; and
 using the list of all columns to resolve ambiguities in the query columns.

13. The computer-implemented method of claim 7, wherein an unqualified column is missing at least one of a schema identity, a table identity or a column identity.

14. A computer system for determining whether a query accesses columns in a database, comprising:
 one or more computing resources having one or more processors and memory including executable instructions that, when executed by the one or more processors, cause the one or more processors to implement at least:
  a database comprising schema, tables and a set of columns, at least a subset of the set of columns containing restricted information, the columns containing restricted information identified in a list of fully qualified columns of interest; and
  a query analysis tool that parses a query to determine a set of query columns, qualifies unqualified columns from the set of query columns by joining unqualified columns from the set of query columns with matching information from the list of fully qualified columns of interest and determines whether columns from the set of query columns exist in the list of fully qualified columns of interest.

15. The computer system of claim 14, further comprising an application programming interface providing access to the query analysis tool and returning a value indicating whether columns from the list of fully qualified columns is potentially accessed.

16. The computer system of claim 14, further comprising a policy enforcement system that interfaces with the query analysis tool to determine whether a submitted query accesses columns from the list of fully qualified columns.

17. The computer system of claim 16, further comprising a policy configuration tool that selects one or more columns or combination of columns to submit to the policy enforcement system as part of a policy to enforce.

18. The computer system of claim 14, wherein the query analysis tool and database are allocated resources from and managed by a program execution service.

19. The computer system of claim 14, further comprising a network over which the query analysis tool and database receive communication.

20. One or more non-transitory computer-readable storage media having collectively stored thereon executable instructions that, when executed by one or more processors of a computer system, cause the computer system to at least:
 receive a list of fully qualified fields of interest and a query;
 parse the query to determine a set of query fields;
 create a set of fully qualified fields by including fully qualified fields from the set of query fields, qualifying unqualified fields from the set of query fields by joining unqualified fields from the set of query fields with matching information from the list of fully qualified fields of interest and discarding unqualified fields without matching information from the list of fully qualified fields of interest; and
 determine potentially accessed fields from the set of fully qualified fields that exist in the list of fully qualified fields of interest.

21. The one or more non-transitory computer-readable storage media of claim 20, wherein the instructions further comprise instructions that, when executed, cause the computer system to at least:
 receive a rule describing one or more combination of fields that result in a privileged access; and
 determine whether the potentially accessed fields include a combination that meets the rule.

22. The one or more non-transitory computer-readable storage media of claim 20, wherein a fully qualified field includes an owner identity, table identity and field identity.

23. The one or more non-transitory computer-readable storage media of claim 20, further comprising resolving an identifier from an alias in the query.

24. The one or more non-transitory computer-readable storage media of claim 20, wherein the fully qualified fields represent fields in a database.

25. The one or more non-transitory computer-readable storage media of claim 24, wherein receiving, parsing, qualifying and determining are performed without communicating with the database.

* * * * *